United States Patent [19]

Alexandrov et al.

[11] 3,838,634

[45] Oct. 1, 1974

[54] PNEUMATIC PIPELINE CONVEYOR FOR BRIQUETTED MATERIALS

[76] Inventors: Adolf Moritsovich Alexandrov, Federativny prospekt, 6, korpus 3, kv. 8, Moscow; Ruben Dzhangirovich Balaian, Volkovskaya ulitsa 9, kv. 31, Moskovskaya oblast; Vladimir Efimovich Aglitsky, Zatsepsky Val, 6/13, kv. 61, Moscow; Jury Abramovich Isimbler, Sojuzny prospekt 10, kv. 261, Moscow; Ilia Solomonovich Kantor, Malo-Moskovskaya ulitsa 31, kv. 45, Moscow; Vladimir Maiorovich Chizhikov, Sojuzny prospekt 26, korpus 1, kv. 75, Moscow; Jury Arnoldovich Topolyansky, Matveevskaya ulitsa, 10, korpus 4, kv. 233, Moscow; Sergei Mikhailovich Susekov, Shosse Entuziastov, 208, korpus 4, kv. 442, Moscow; Nikolai Fedorovich Gulyaev, ulitsa Gorkogo, 40, kv. 20, Moscow; Pavel Vasilievich Kovanov, B, Bronnaya ulitsa, 19-21, kv. 23, Moscow; Mark Leontievich Itskovich, ulitsa Pivchenkova, 4, kv. 51, Moscow; Petr Grigorievich Leschinsky, Bazovskaya ulitsa, 22V, kv. 7, Moscow, all of U.S.S.R.

[22] Filed: June 26, 1973

[21] Appl. No.: 373,870

[52] U.S. Cl................... 100/50, 100/190, 100/218, 425/139, 425/149, 425/256, 425/441, 425/DIG. 108
[51] Int. Cl.......................... B30b 15/22, B29b 5/06
[58] Field of Search ...... 100/50, 190, 218; 425/139, 425/149, 256, 441, DIG. 108

[56] References Cited
UNITED STATES PATENTS

| | | | |
|---|---|---|---|
| 2,788,267 | 4/1957 | Larson et al. | 302/28 X |
| 3,501,890 | 3/1970 | Hunt | 100/218 X |
| 3,608,476 | 9/1971 | Price et al. | 100/50 X |
| 3,636,863 | 1/1972 | Woyden | 100/218 X |

*Primary Examiner*—James B. Marbert
*Assistant Examiner*—W. Scott Carson
*Attorney, Agent, or Firm*—Holman & Stern

[57] ABSTRACT

A pneumatic pipeline conveyor having an extensive system of pipes, is disclosed provided at one end with material receivers installed above the briquetting devices the latter being provided with power-operated ejectors having a transmitter indicating their lower position, and an unloading port. Located under the briquetting devices is a loading station accommodating a train of containers and fitted with a transmitter indicating the position of said containers under the unloading ports. The ejector carries a briquette-density transmitter connected electrically with the ejector and cover drives via a control unit which is also connected with the container-position transmitters, the ejector lower-position transmitter and the cover open-position transmitter.

2 Claims, 4 Drawing Figures

PNEUMATIC PIPELINE CONVEYOR FOR BRIQUETTED MATERIALS

BACKGROUND OF THE INVENTION

The present invention relates generally to the systems for conveying loads through pipelines and more specifically, it relates to pneumatic pipeline conveyors for briquetted materials.

The present invention can be used most successfully for the conveyance of domestic and industrial refuse from big towns and industrial centers to the points of their processing or disposal located at a considerable distance from the town.

The pneumatic pipeline conveyors for municipal refuse which are known in the art comprises an extensive system of pipes for conveying refuse in a flow of air, one end of these pipes being provided with refuse receivers connected to vacuum pumps for creating vacuum in the pipes, briquetting devices installed under the receivers and provided, each with a power-operated ejector of a finished briquette with its lower-position transmitter and an unloading port located underneath and closed in the course of briquetting by a power-operated cover provided with an open-position transmitter (see, for example, Patent No. 1594025, France, 1968). In this system the refuse is conveyed over small distances only within the limits of a single small district, and is further transported to the processing sites by refuse trucks.

The use of such trucks cannot prevent contacts of men (truck drivers) with household refuse and fails to relieve the traffic stress in the streets of the big modern towns, thus increasing noise and pollution of the town atmosphere.

SUMMARY OF THE INVENTION

An object of the present invention is to eliminate the aforesaid disadvantages.

The main object of the invention is to provide a pneumatic pipeline conveyor, mostly for municipal and industrial refuse which would ensure its continuous automatic conveyance over considerable distances by providing an enclosed system of conveying pipes equipped with signalling and controlling transmitters.

This object is accomplished by providing a pneumatic pipeline conveyor for briquetted materials comprising an extensive system of pipes for conveying materials in a flow of air, one end of these pipes being provided with material receivers connected to vacuum pumps for creating vacuum in the pipes, briquetting devices installed under the receivers and provided, each, with a power-operated ejector of a finished briquette with its lower-position transmitter and an unloading port located underneath and closed in the course of briquetting by a power-operated cover having its open-position transmitter wherein, according to the invention, there is a loading station under the briquetting devices, the station accommodating a train of containers intended for being conveyed through a pipeline to an unloading station under the effect of air pressure difference and provided with a transmitter indicating the position of the containers under the unloading ports while an ejector is provided with a briquette-density transmitter connected electrically with the drives of the ejector and cover via a control unit, the latter being also connected with the tramsmitters showing the position of the containers, the lower position of the ejector and the open position of the cover so that when the container-position transmitter sends a signal that the containers are located under the unloading ports and the briquette-density transmitter sends a signal that the briquette is ready, this opens the cover and, after its opening, its transmitter switches on the drive of the ejector and the ejector loads the finished briquette into the container.

The arrangement of the loading station with the train of containers under the unloading port of the briquetting device and its connection via the pipeline with the unloading station makes up an enclosed pipeline conveying system, while the employment of transmitter ensures continuous automatic conveyance of materials through this system over considerable distances without resorting to the services of refuse trucks.

It is also practicable, according to the invention, that the briquette-density transmitter be made in the form of hydraulic cylinder with the rod protruding from both its ends, the lower end of the rod contacting the material being briquetted during the downward movement of the rod while its upper end is provided with a permanent magnet interacting with the contacts which are immovable with relation to the rod and electrically connected with the control unit. Due to the fact that the density of the briquette is determined in this type of transmitter by a feeler whose function is performed by the hydraulic cylinder rod, this promotes the accuracy of determining the degree of readiness of the briquette and eliminates the possibility of transmitting a false signal when the rod strikes a hard solid object that has found its way into the material being briquetted, the latter advantage must be attributed to the fact that the probability of the rod striking a hard object is very slight.

DETAILED DESCRIPTION OF THE PREFERRED EMBODIMENT

Figure 1:
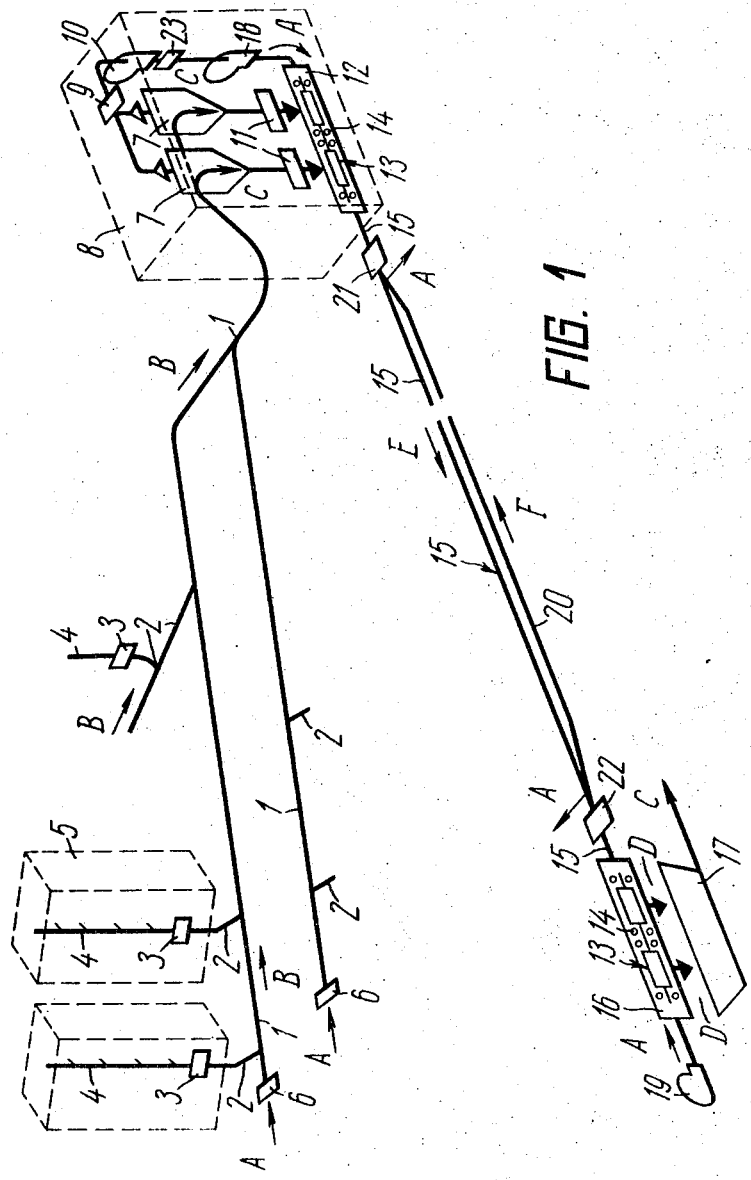
FIG. 1 is an elementary diagram of the pipeline according to the invention.

The pipeline conveyor according to the invention comprises an extensive system of pipes 1 (FIG. 1) connected at one end through branches 2 and valves 3 to the refuse chutes 4 of residential buildings 5. A valve 6 installed at the dead end of the pipes 1 supplies atmospheric air into the pipes. The supply of atmospheric air is shown in the drawing by arrow A and the conveyance of refuse in the flow of air, by arrow B. Installed at the other ends of these pipes are refuse receivers 7 located in a refuse-transfer station 8. These receivers are connected via filters 9 to vacuum pumps 10 for producing vacuum in the pipes 1. Located under the receivers 7 are devices 11 for briquetting the refuse delivered from the receivers 7. The movement of loose refuse is shown in the drawing by arrow C.

According to the invention, there is a loading station 12 installed under the briquetting devices 11 and accommodating a train of containers 13 for the finished briquettes, the containers moving on wheels 14 over a pipeline 15 to an unloading station 16 located at the refuse processing site. In the unloading station 16 the briquettes are discharged from the containers 13 into a receiving installation 17 located under the containers. The discharge of briquettes from the containers is shown in the drawing by arrow D and the movement of the containers with briquettes through the pipeline 15, by arrow E. The containers are moved by the air pressure differential created by air sources 18 and 19, connected, respectively, to stations 12 and 16. The empty trains of containers 13 are returned either through the pipeline 15 or the pipeline 20 which can be connected to the ends of the pipeline 15 by means of switches 21 and 22. The movement of empty containers is shown in the drawing by arrow F.

The air discharged by the pumps 10 through silencers 23 may be delivered to the suction side of the source 18.

The clean air is drawn in at the unloading station 16 in the zone located sufficiently far from the refuse processing site. At the same time, polluted air will be discharged from the source 18 through the pipeline 15 beyond the town limits.

In order to build up a low pressure in the refuse-transfer station 8, the compressed air source 18 draws out an additional amount of air from this station thus ensuring a constant inflow of fresh atmospheric air into it.

Figure 2:
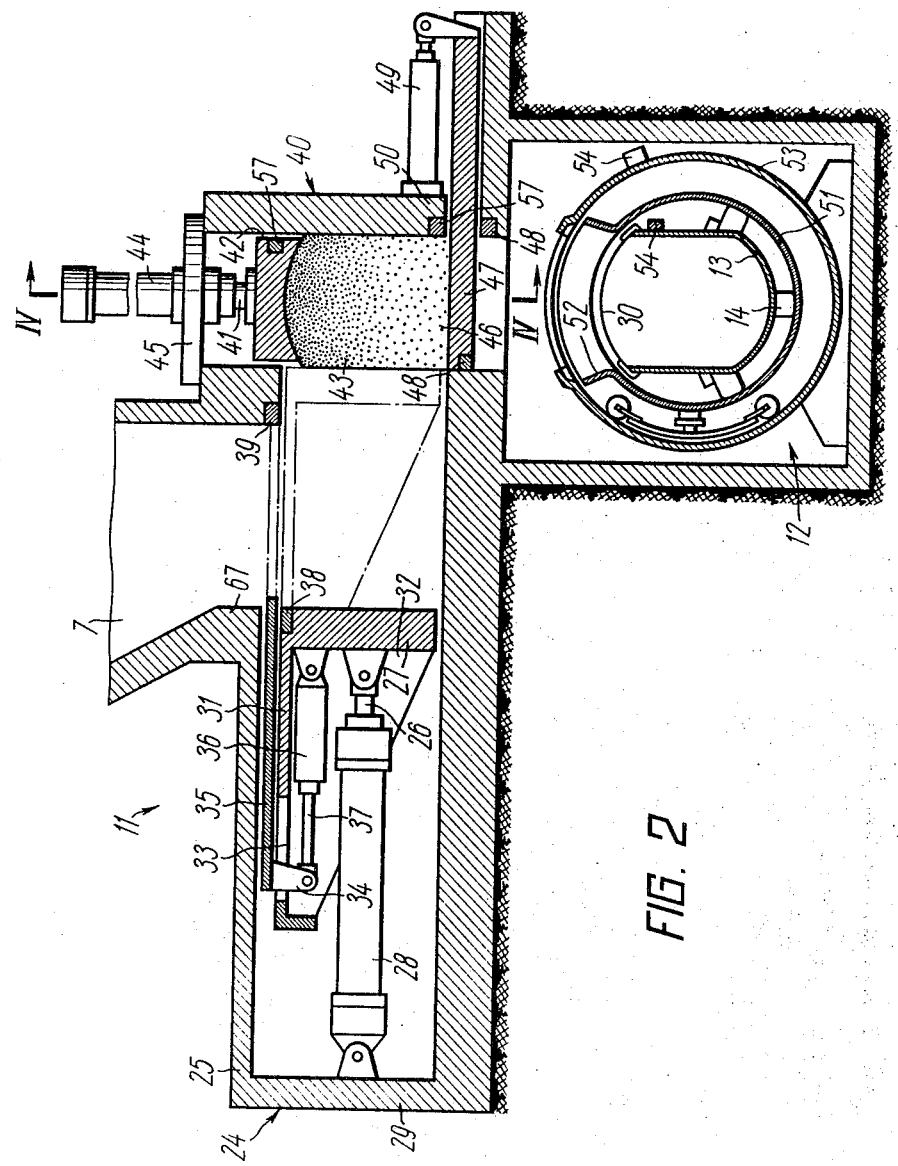
FIG. 2 is a cross section through a briquetting device with an ejector and an unloading station installed under it and accommodating a train of containers.

Each briquetting device 11 comprises a horizontal press 24 (FIG. 2) with a chamber 25 accommodating a rod 26 with a piston 27. The rod is actuated by a hydraulic cylinder 28 secured to the vertical wall 29 of the chamber 25. The cross section of the chamber 25 and piston 27 is a rectangle whose size across the width of the chamber corresponds to the length of the loading port 30 of the container 13. The upper part of the piston 27 is provided with a rigidly connected closing shutter 31 and stiffener ribs 32. The closing shutter 31 has a cutout 33 accommodating a shackle 34 which is rigidly connected with a closing shutter 35 movably mounted relative to the piston 27. The closing shutter 35 is moved by the hydraulic cylinder 36 secured at the inner side of the piston 27 for which purpose the rod 37 of the hydraulic cylinder 36 is articulated to the shackle 34. The upper edge 38 of the piston 27 at the side where it contacts the refuse being briquetted is made of some hard material. The lower edge 39 of the receiver 7 is somewhat displaced upward relative to the upper edge 38 and located opposite the closing shutter 35. This edge is likewise made from a hard material. The device 11 has also a power-operated ejector 40 in the form of a rod 41 with a piston 42, both being accommodated in a chamber 43. The chamber 43 adjoins the chamber 25 across its entire width. The rod 41 is moved by a hydraulic cylinder 44 installed on the plate 45 of the chamber 43. The chamber 43 and piston 42 are also rectangular in cross section.

An unloading port 46 located under the piston 42 is closed in the course of briquetting with a power-operated cover 47. On this cover is installed a transmitter 48 indicating the open position of the cover while the power drive of the cover consists of a hydraulic cylinder 49 secured at the outer surface of the vertical wall 50 of the chamber 43. The loading station 12 is a swivelling pipe 51 with a port 52 located inside a fixed pipe 53 whose external surface carries a transmitter 54 indicating the position of the containers 13 under the unloading port 46.

Installed on the piston 42 (FIG. 3) is a briquette-density transmitter 55 which is connected electrically, via a control unit 56, with the hydraulic cylinders 44 and 49. The control unit is also connected electrically with the container position transmitter, the transmitter 57 indicating the lower position of the piston 42 of the ejector 40, and the transmitter 48 indicating the open position of the cover 47. This connection is arranged in such a manner that after the transmitter 54 gives a signal indicating that the containers have arrived under the unloading ports and the briquette density transmitter 55 gives a signal indicating that the briquette is ready, the cover 47 opens (moving to the right in the drawing), and the signal of its transmitter 48 starts the hydraulic cylinder 44 which moves the rod 41 with the piston 42 down (in the drawing) for loading a finished briquette through the loading ports 52 and 30 into the container 13.

Figure 3:
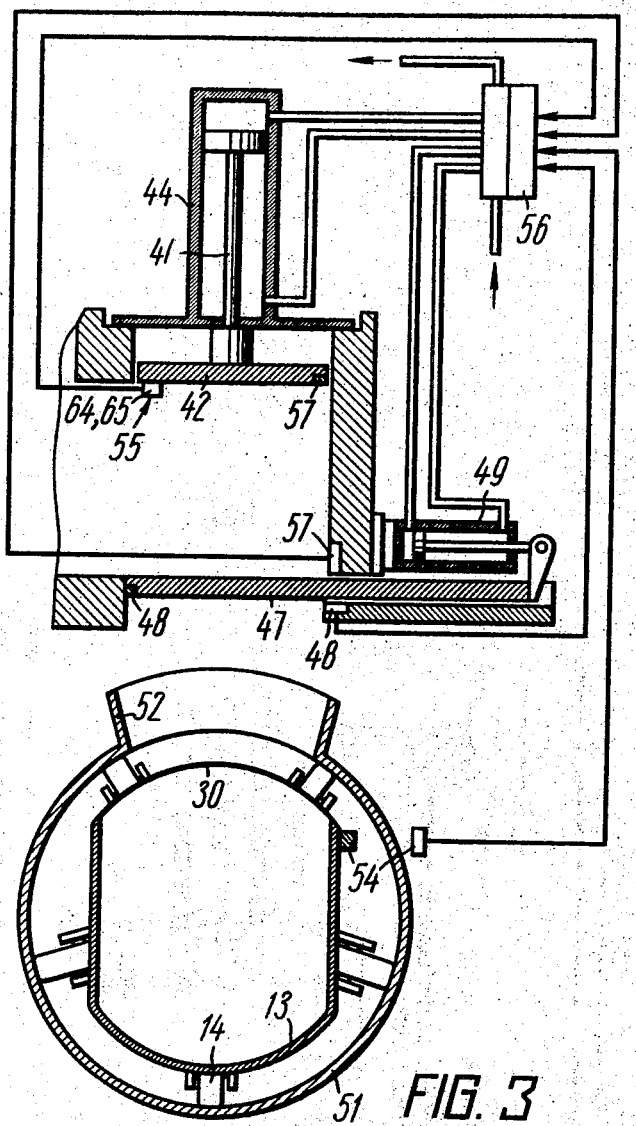
FIG. 3 is a diagram of hydraulic and electrical connections of the ejector and cover drives and of the signal transmitters with the control unit.
Figure 4:
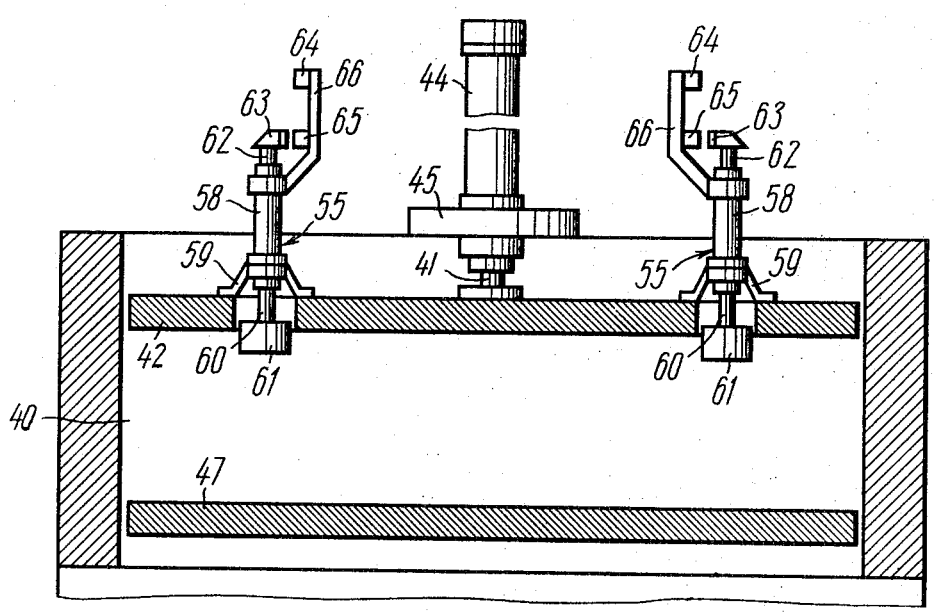
FIG. 4 is a section view taken along the line IV—IV in FIG. 2.

Each of the two transmitters 55 installed on the ejector consists of a hydraulic cylinder 58 (FIG. 4) which is secured by a bracket 59 on the upper side of the piston 42. The hydraulic cylinder is provided with a rod protruding from its both ends. When the lower end 60 of the rod moves down (in the drawing), it comes in contact with the pressed refuse through a piston 61 fastened to the end 60. Secured to the upper end 62 of the rod is a permanent magnet 63 which interacts with the magnetically controlled pressurized contacts 64 and 65 which are immovable with relation to the rod and installed on a bracket 66 secured to the hydraulic cylinder 58. The contact 64 serves as a transmitter of the upper position of the rod whereas the contact 65 is a transmitter indicating the preset degree of compaction of the refuse being briquetted. Both contacts are electrically connected with the control unit 56 as shown in FIG. 3.

All the above-mentioned transmitters, viz., 48, 54 and 57 are similar in design to the transmitters 55 since they incorporate a movable permanent magnet interacting with the fixed magnetically-controlled contacts electrically connected with the control unit.

The required vacuum is maintained in the system of pipes 1 and branches 2 with the aid of vacuum pumps 10.

The successive opening of the valves 6 in the corresponding branches of the pipeline 1 creates the required velocity of the air. Then the refuse chutes 4 of the residential buildings 5 are connected to the pipeline 1 by the successively and automatically opening valves 3. Passing through the valves 3, the refuse is entrained by the flow of air into the receivers 7. From here the refuse moves into the chamber 25 of the horizontal press 24 of the briquetting device 11, the chamber 25 adjoining the unloading port 67 of the receiver. The piston 27 actuated by the hydraulic cylinder 28 shifts the refuse towards the chamber 43 of the ejector 40. The movable shutter 35 actuated by the hydraulic cylinder 36 opens the port 67 with a certain lead relative to the movement of the piston 27. This ensures the cutting off of the material contained in the receiver 7. Hard and, particularly, long objects (pieces of rope, ‾e, etc.) are pressed by the shutter 35 against the lower edge 39 of the receiver 7 and, during the further movement of the piston 27 executing its working stroke, are cut by its upper edge 38, so that the briquette is cut off from the mass of material contained in the receiver 7.

Each working stroke of the piston 27 is followed by a compaction check of the material being compressed. This is done automatically during the idle stroke of the piston 27 with the aid of the briquette-density transmitter 55 whose piston 61 is extended by the hydraulic cylinder 58. In case of insufficient compaction the piston 61 goes down and takes a position in which the magnet 63 descends below the contact 65. A short signal received in the automatic control circuit of the horizontal press at the moment when the magnet 63 moves past the contact 65 ensures the subsequent working stroke of the piston 27. The material continues to be delivered into the chamber 43 and compacted there until the piston 61, moved down with a preadjusted force, encounters a resistance of the material being compacted and occupies a position in which the magnet 63 comes opposite the contact 65. Then, if there is a container 13 under the unloading port 46 of the loading station 12, the position of the container being indicated by the transmitter 54, the cover 47 is opened by the hydraulic cylinder 49 on the signals of the transmitters 54 and 55 delivered into the control unit 56. Now, on a signal delivered to the control unit 56 by the transmitter 48 indicating the open position of the cover 47, the piston 42 of the ejector 40 is actuated by the hydraulic cylinder 44 and discharges a compacted briquette into the container 13.

The above-described briquetting device and unloading station are of a built-up design consisting of several sections which makes it possible to compress and deliver the finished briquettes simultaneously into any desired number of containers combined into a train.

On completion of loading the containers 13 with briquettes, a signal delivered into the control unit 56 from the cover lower-position transmitter 57 gives a command for returning the piston 42 to its upper position and for closing the unloading port 46 by the cover 47.

After sealing the loading ports of the loading station 12, the train of containers 13 is moved by the pressure of compressed air from the source 18 or under the effect of vacuum created by the source 19 along the pipeline 15 to the unloading station 16 located at the refuse-processing site.

Here the briquettes are discharged from the containers into the receiving installation 17 for further processing.

The empty train of containers 13 acted upon by compressed air from the source 19 or by vacuum from the source 18 returns to the station 12 through the pipeline 15 (in the single-tube installations or through the pipeline 20 (in the double-tube installations), the pipeline 20 being connected to the ends of the pipeline 15 with the aid of switches 21 and 22.

We claim:

1. A pneumatic pipeline conveyor for briquetted materials comprising: an extensive system of pipes for conveying materials in a flow of air; vacuum pumps adapted to create vacuum in said pipes; material receivers being disposed at one end of said pipes and connected to said vacuum pumps; briquetting devices being installed under said receivers; power-operated ejectors for ejecting finished briquettes being disposed in said briquetting devices and provided with lower-position transmitters; unloading ports being disposed under said ejectors and adapted for the passage of the finished briquettes; a power-operated cover which closes said unloading ports in the course of briquetting; an open-position transmitter of said cover; a loading station being installed under said briquetting devices; a train of containers accommodated in said loading station and adapted to receive the finished briquettes discharged through said unloading ports; a transmitter indicating the position of said containers under said unloading ports; a pipeline for the conveyance of said containers under the effect of a differential air pressure; an unloading station being connected with said loading station by said pipeline and adapted to receive said containers with the finished briquettes; a briquette-density transmitter being installed on each of said ejectors; and a control unit providing electrical connection between said briquette-density transmitter and the drives of said ejector and cover; said control unit being electrically connected with said container-position transmitters, the ejector lower-position transmitter and cover open-position transmitter; said transmitters being electrically connected with the control unit so that, after said control unit receives a signal from said container-position transmitter indicating that said containers are located under said unloading ports and from said briquette-density transmitter indicating that the briquette is sufficiently compacted, said cover opens and the signal from its open-position transmitter turns on the ejector drives which shift said ejectors to allow the finished briquettes to be loaded into said containers through said unloading ports.

2. A pneumatic pipeline conveyor as claimed in claim 1, wherein said briquette-density transmitter comprises a hydraulic cylinder having a rod extending from both of its ends, the lower end of said rod contacting the material being briquetted during the downward movement of said rod while its upper end carries a permanent magnet; and contacts which are immovable with respect to said rod and interact with said permanent magnet, and are electrically connected with said control unit.

* * * * *